US012637317B2

(12) United States Patent
Lin et al.

(10) Patent No.: US 12,637,317 B2
(45) Date of Patent: May 26, 2026

(54) PRINTING EQUIPMENT AND CONTINUOUS FEEDING AND CUTTING DEVICE THEREOF

(71) Applicant: KINPO ELECTRONICS, INC., New Taipei City (TW)

(72) Inventors: Chien-Yu Lin, New Taipei City (TW); Wei-Chun Jau, New Taipei City (TW); Tsung-Hua Kuo, New Taipei City (TW)

(73) Assignee: KINPO ELECTRONICS, INC., New Taipei City (TW)

( * ) Notice: Subject to any disclaimer, the term of this patent is extended or adjusted under 35 U.S.C. 154(b) by 166 days.

(21) Appl. No.: 18/431,529

(22) Filed: Feb. 2, 2024

(65) Prior Publication Data

US 2025/0128902 A1 Apr. 24, 2025

(30) Foreign Application Priority Data

Oct. 19, 2023 (CN) ........................ 202311358955.X

(51) Int. Cl.
*B65H 35/00* (2006.01)
*B65H 23/04* (2006.01)
(Continued)

(52) U.S. Cl.
CPC ....... *B65H 35/0073* (2013.01); *B65H 23/048* (2013.01); *B65H 35/06* (2013.01);
(Continued)

(58) Field of Classification Search
CPC ..... G03G 15/6523; G03G 2215/00459; B65H 35/00; B65H 35/006; B65H 35/0073;
(Continued)

(56) References Cited

U.S. PATENT DOCUMENTS 3,673,905 A * 7/1972 Kono ................ G03G 15/6523 83/175
4,941,377 A * 7/1990 Ishihara .................. B41J 11/48 400/621

(Continued)

FOREIGN PATENT DOCUMENTS

EP 1780029 A1 * 5/2007 ........... B65H 23/048
JP S6487451 A 3/1989

(Continued)

*Primary Examiner* — Evan H MacFarlane
(74) *Attorney, Agent, or Firm* — HDLS IPR SERVICES; Chun-Ming Shih

(57) ABSTRACT

This disclosure is directed to a printing equipment and a continuous feeding and cutting device thereof. The continuous feeding and cutting device is detachably assembled on an inlet of the printer and applied to a continuous form paper. The continuous feeding and cutting device has a paper picking module for transferring the continuous form paper to the inlet, a buffering module, a cutting mechanism and a processing unit. The buffering module is arranged between the inlet and the paper picking module for guiding the continuous form paper to perform a curved manner to the inlet. The cutting mechanism is arranged between the paper picking module and the curved guide for cutting the continuous form paper. The processing unit is electrically connected to the cutting mechanism for controlling the cutting mechanism to cut the continuous form paper.

12 Claims, 4 Drawing Sheets

2

(51) Int. Cl.
*B65H 35/06* (2006.01)
*G03G 15/00* (2006.01)

(52) U.S. Cl.
CPC ... *G03G 15/6523* (2013.01); *B65H 2404/722* (2013.01); *B65H 2801/24* (2013.01)

(58) Field of Classification Search
CPC .. B65H 35/008; B65H 35/0086; B65H 35/06; B65H 23/048; B65H 2404/722; B65H 2801/24; B65H 2801/31
See application file for complete search history.

(56) References Cited

U.S. PATENT DOCUMENTS

| | | | | |
|---|---|---|---|---|
| 6,101,365 | A * | 8/2000 | Nishikawa | G03G 15/6526 399/400 |
| 2018/0282103 | A1* | 10/2018 | Sato | G03G 15/652 |

FOREIGN PATENT DOCUMENTS

| | | | |
|---|---|---|---|
| JP | H03256765 | A | 11/1991 |
| JP | 2000272791 | A | 10/2000 |
| JP | 2016159488 | A | 9/2016 |
| JP | 2019077182 | A | 5/2019 |

* cited by examiner

PRINTING EQUIPMENT AND CONTINUOUS FEEDING AND CUTTING DEVICE THEREOF

BACKGROUND OF THE DISCLOSURE

Technical Field

This disclosure is directed to a continuous feeding and cutting device of a printer, in particular to a printing equipment and a continuous feeding and cutting device thereof.

Description of Related Art

A dot matrix printer has a set of pins for printing, the pins can accurately hit on a copy paper to print with a copy. Therefore, Dot matrix printers are usually use for printing continuous form papers such as invoices, shipping orders, receipts, and medication orders.

However, the dot-matrix printer is noisy and monochromatic, and has a resolution of about 300 dpi. These makes users feel troubled during operation. Therefore, it is an important issue in the industry that how to print the continuous form paper by a common laser printer in the office when it is printed without a copy.

In views of this, in order to solve the above disadvantage, the inventor studied related technology and provided a reasonable and effective solution in this disclosure.

SUMMARY OF THE DISCLOSURE

This disclosure is directed to a printing equipment and a continuous feeding and cutting device thereof, the continuous feeding and cutting device is detachably assembled on an inlet of the printer so that the printer is capable of printing, cutting, and printing with cutting.

According to this disclosure, this disclosure is directed to a printing equipment applied to a continuous form paper. The printing equipment has: a printer having an inlet and capable of generating a printing information; and a continuous feeding and cutting device detachably assembled to the printer and disposed corresponding to the inlet. The continuous feeding and cutting device has: a paper picking module for transferring the continuous form paper to the inlet; a buffering module arranged between the inlet and the paper picking module for guiding the continuous form paper to perform a curved manner to the inlet; a cutting mechanism arranged between the paper picking module and the curved guide for cutting the continuous form paper; and a processing unit electrically connected to the printer and the cutting mechanism for receiving and calculating the printing information and then controlling the cutting mechanism to cut the continuous form paper.

In an embodiment of this disclosure, this disclosure is directed to a continuous feeding and cutting device detachably assembled on an inlet of a printer and applied to a continuous form paper. The continuous feeding and cutting device has: a paper picking module for transferring the continuous form paper to the inlet; a buffering module arranged between the inlet and the paper picking module guiding the continuous form paper to perform a curved manner to the inlet; a cutting mechanism arranged between the paper picking module and the curved guide for cutting the continuous form paper; and a processing unit electrically connected to the printer and the cutting mechanism for controlling the cutting mechanism to cut the continuous form paper.

Accordingly, the continuous feeding and cutting device may be additionally disposed on the inlet of the printer to allow the printer to print, cut and print and cut at the same time. Moreover, the continuous feeding and cutting device is capable of cutting automatically, it is convenient for a user to take the printed document, and the printer is also prevented from damaged caused by too many unprinted continuous form papers contained in the printer.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Detailed descriptions and technical contents of this disclosure is described in the flowing paragraph with reference to the drawings. However, the drawings are attached only for illustration and are not intended to limit this disclosure.

Figure 1:
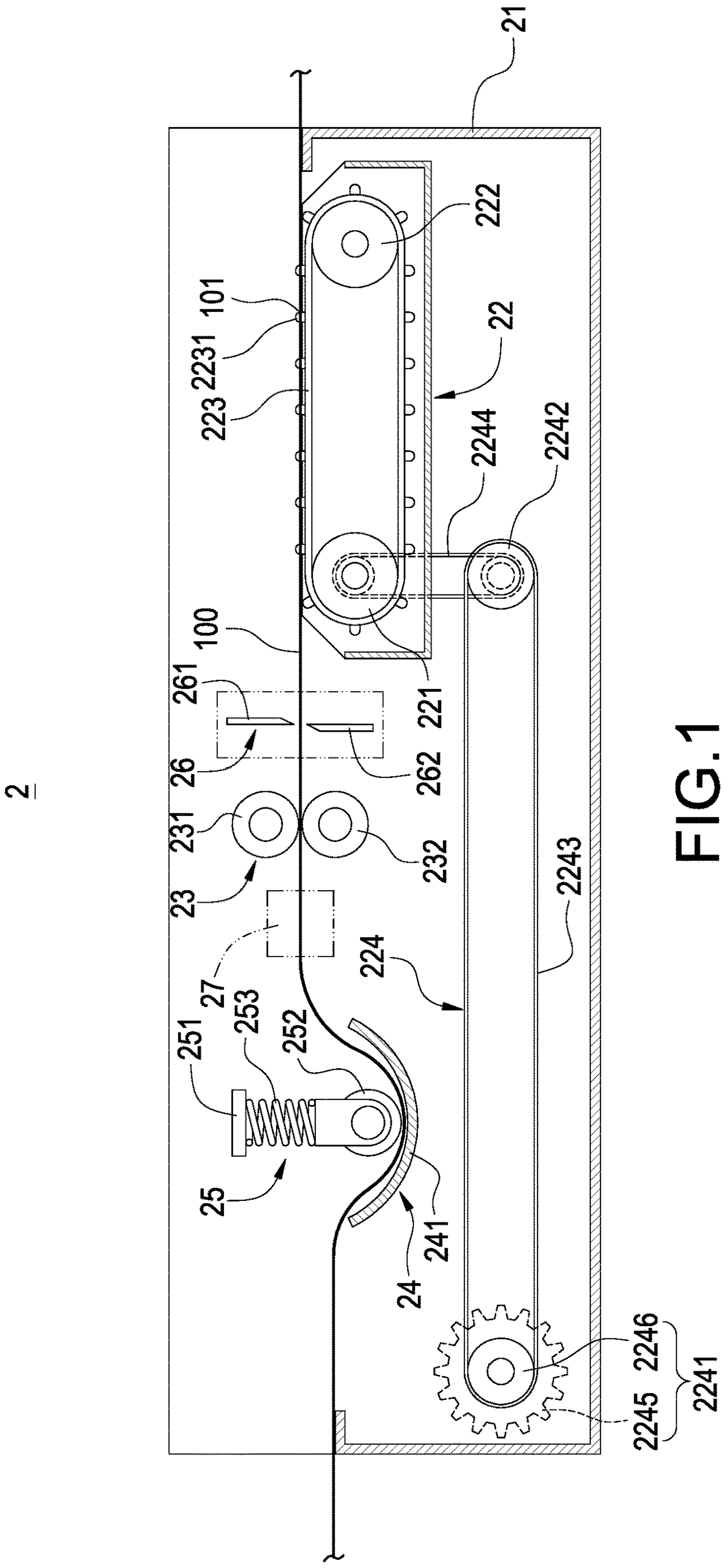
FIG. 1 is a cross-sectional view showing the continuous feeding and cutting device of this disclosure.
Figure 2:
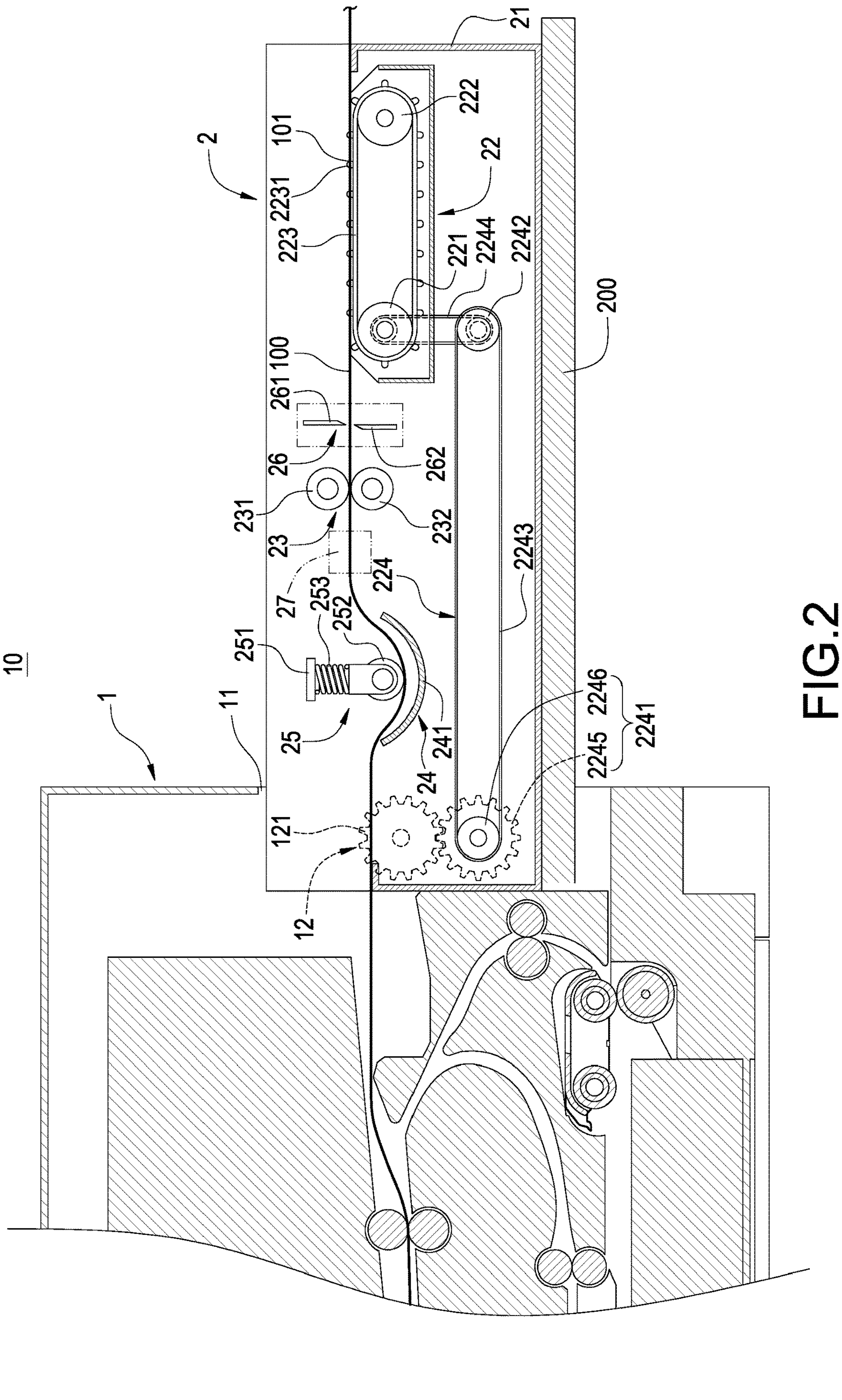
FIG. 2 is a cross-sectional view showing the printing equipment of this disclosure.

According to FIGS. 1 to 2, this disclosure provides a printing equipment and a continuous feeding and cutting device thereof which are applied to a continuous form paper 100. The continuous form paper 100 has a plurality of holes 101. The printing equipment 10 has a printer 1 and a continuous feeding and cutting device 2, the continuous feeding and cutting device 2 has a paper picking module 22, a buffering module 24, a cutting mechanism 26 and a processing unit 3.

According to FIG. 2, the printer 1 has an inlet 11 and a feeding mechanism 12 arranged corresponding to the inlet 11, and the feeding mechanism 12 is configured to transfer the paper sheets into the inlet 11. The feeding mechanism 12 has a feeding wheel (not shown in figures) and a driving gear group (not shown in figures), the driving gear group (not shown in figures) drives the feeding wheel (not shown in figures) to rotate. The feeding wheel (not shown in figures) is capable of transferring the paper sheets into the printer 1 through the inlet 11 when rotating. The driving gear group (not shown in figures) has a linking gear 121. According to this embodiment, the printer 1 is a Laser printer, but scopes of this disclosure should not be limited to the embodiment.

According to FIGS. 1 to 2, the continuous feeding and cutting device 2 further has a portable platform 21, and the printer 1 has a manual input tray 200 disposed at the inlet 11 and may be correspondingly disposed to let the inlet 11 be opened or closed. A user may firstly arrange the portable platform 21 on the manual input tray 200, and then assemble the portable platform 21 to the inlet 11 of the printer 1. The portable platform 21 is detachably assembled on the printer 1, namely that the portable platform 21 may be assembled to or detached from the printer 1, so that the continuous feeding and cutting device 2 is detachably connected to the printer 1 and disposed corresponding to the inlet 11.

According to FIGS. 1 to 2, the paper picking module 22 is configured to transfer the continuous form paper 100 to the inlet 11, the paper picking module 22 has a transmission endless belt 223, driving wheel 221, a follower wheel 222 and a hooping the driving wheel 221, and the follower wheel 222 and driven by a rotation of the driving wheel 221, the transmission endless belt 223 has a plurality of bumps 2231, the bumps 2231 may insert into the holes 101 of the continuous form paper 100 respectively. The transmission endless belts 223 may be chains or straps, but it is not limited to this.

Moreover, the paper picking module 22 further has a transmission mechanism 224, the transmission mechanism 224 has one end connected with the driving wheel 221 and driving the driving wheel 221 to rotate, and another end having an electromagnetic clutch 2241. The electromagnetic clutch 2241 has a driving part 2245 and a driven part 2246, the driving part 2245 and the driven part 2246 may be connected to or separated from each other by an electromagnetic mechanical connector (not shown in figures). The driving part 2245 is engaged with the linking gear 121 and rotated by the linking gear 121.

Furthermore, as aforementioned paragraph, the transmission mechanism 224 has the electromagnetic clutch 2241, a driven wheel 2242, a first track 2243 and a second track 2244. The first track 2243 hoops the driven part 2246 and the driven wheel 2242 and driven by a rotation of the driven part 2246, the second track 2244 hoops the driven wheel 2242 and the driving wheel 221 and driven by the rotation of the driven wheel 2242. The first track 2243 and the second track 2244 may be chains or straps, but it is not limited to this.

Moreover, when the driving part 2245 and driven part 2246 are engaged with each other, the driving part 2245 drives the driven part 2246 to rotate, the driven part 2246 further drives the first track 2243 to rotate the driven wheel 2242, the driven wheel 2242 further drives the second track 2244 and the driving wheel 221 to rotate, and the driving wheel 221 drives the transmission endless belt 223 and the follower wheel 222 to rotate finally. The transmission endless belt 223 transfer continuously drive the continuous form paper 100 to move toward the inlet 11 of the printer 1 by the plurality of bumps 2231 inserted into the holes 101. Furthermore, when the driving part 2245 is separated from the driven part 2246, the driving part 2245 cannot drive the driven part 2246 to rotate.

According to FIGS. 1 to 2, the buffering module 24 is arranged between the inlet 11 and the paper picking module 22. The buffering module 24 is configured to guide the continuous form paper 100 in a curved manner to the inlet 11. The buffering module 24 has a curved guide 241 and a paper presser 25, the curved guide 241 is arranged between the inlet 11 and the paper picking module 22, the curved guide 241 has a cross section of a U-shape, so that the continuous form paper 100 is firstly curved by the curved guide 241 to perform a curved manner and then transferred to the inlet 11.

According to FIGS. 1 to 2, the paper presser 25 is disposed over the curved guide 241, the paper presser 25 is configured to press the continuous form paper 100, the paper presser 25 has a fixed seat 251, a pressing pulley 252 and a spring 253, the fixed seat 251 is disposed over the curved guide 241, the pressing pulley 252 is disposed between the curved guide 241 and the fixed seat 251, the spring 253 is disposed between the fixed seat 251 and the pressing pulley 252 for elastically supporting and driving the pressing pulley 252 to press the continuous form paper 100.

According to FIGS. 1 to 2, the cutting mechanism 26 is disposed between the paper picking module 22 and the buffering module 24, the cutting mechanism 26 is configured to cut the continuous form paper 100. According to this embodiment, the cutting mechanism 26 has an upper cutter 261 and a lower cutter 262, the upper cutter 261 and the lower cutter 262 are respectively disposed at an upper side and a lower side of the continuous form paper 100 for cooperating with each other to cut the continuous form paper 100, by scope of this disclosure should not be limited to the embodiment. The cutting mechanism 26 may has only the upper cutter 261, and the continuous form paper 100 may cut by the upper cutter 261 moving downward.

According to FIGS. 1 to 2, continuous feeding and cutting device 2 further has a paper fixing wheel 23. The paper fixing wheel 23 is arranged between the buffering module 24 and the cutting mechanism 26, and the paper fixing wheel 23 is configured for clamping the continuous form paper 100. In following detail descriptions, the paper fixing wheel 23 has an upper pulley 231 and a lower pulley 232 respectively disposed at the upper side and the lower side of the continuous form paper 100 for cooperating with each other to press the continuous form paper 100.

Moreover, the processing unit 3 is electrically connected to the printer 1, the cutting mechanism 26 and the electromagnetic clutch 2241. The processing unit 3 calculates a printing information when receiving that, then correspondingly controls the driving part 2245 to engage or separated from the driven part 2246, and controls the cutting mechanism 26 to cut the continuous form paper 100.

Specifically, the processing unit 3 may receive the printing information from the printer 1 via a connecter or a wireless connection, the processing unit 3 may be arranged on the cutting mechanism 26 or on the electromagnetic clutch 2241 and may control the cutting mechanism 26 and the electromagnetic clutch 2241 by remote controlling.

According to FIGS. 1 to 2, the continuous feeding and cutting device 2 further has a paper sensor 27, the paper sensor 27 is arranged between the paper fixing wheel 23 and the buffering module 24, the paper sensor 27 is configured to generate a paper detect signal when detecting the continuous form paper 100, the processing unit 3 is configured to receive and calculate the paper detect signal and then correspondingly controlling the cutting mechanism 26 to cut the continuous form paper 100.

Moreover, the paper picking module 22, paper fixing wheel 23, the curved guide 241, the paper presser 25, the cutting mechanism 26 and the paper sensor 27 aforementioned are contained in the portable platform 21, and the curved guide 241 and the fixed seat 251 are extended from the portable platform 21.

According to an operation status of the printing equipment 10 and the continuous feeding and cutting device 2 of this disclosure as shown in FIGS. 1 to 2, one end of the continuous form paper 100 is inserted into the paper fixing wheel 23, and the processing unit 3 controls the driving part 2245 to engage the driven part 2246 when the processing unit 3 receives a printing information of start, so that the driven part 2246 is driven to rotate by the linking gear 121 and the driving part 2245, the continuous form paper 100 is transferred to the curved guide 241 by the paper picking module 22, and the continuous form paper 100 is then performed a curved manner corresponding to a shape of the curved guide 241 and then transferred to the inlet 11. Finally, the continuous form paper 100 is transferred into the printer 1 for printing.

Then, the printer 1 and the processing unit 3 calculate a printing length of the continuous form paper 100 according to a requirement of a printed data when the paper sensor 27 detects a leading edge of the continuous form paper 100.

When the paper sensor 27 further detects a length of the continuous form paper 100 is equal to the printing length or a length of the continuous form paper 100 calculated by the processing unit 3 calculates is equal to the printing length, the processing unit 3 controls the cutting mechanism 26 to cut the continuous form paper 100, and the processing unit 3 meanwhile controls the driving part 2245 to separate from the driven part 2246, namely that the continuous feeding and cutting device 2 stop transferring the continuous form paper 100. When the continuous feeding and cutting device 2 stops transferring the continuous form paper 100, the feeding mechanism 12 keeps transferring the continuous form paper 100 into the inlet 11 until the printed data is completely printed by the printer 1.

According to FIG. 2, if the feeding mechanism 12 keep transferring the continuous form paper 100 into the inlet 11 when the continuous feeding and cutting device 2 stop transferring the continuous form paper 100, the feeding mechanism 12 provides a larger pulling force to the continuous form paper 100 and further moves the continuous form paper 100 far from the curved guide 241. At the same time, the paper presser 25 has the spring 253 providing buffering force for keeping pressing the continuous form paper 100, so that the continuous form paper 100 is prevented from skew or being pulled, the continuous form paper 100 can be printed and cut at the same time without pulling, and printing errors or imperfections caused by pulling is avoid.

Additionally, the continuous form paper 100 is transferred between the upper pulley 231 and the lower pulley 232 when passing through the cutting mechanism 26, the continuous form paper 100 is limited at specific position by the upper pulley 231 and the lower pulley 232, so that the continuous form paper 100 is prevented from cutting failure caused by insufficient tension if the continuous form paper 100 is too thin or too soft. The upper cutter 261 is cooperated with the lower cutter 262 to cut the continuous form paper 100 with a predetermined length.

Accordingly, the continuous feeding and cutting device 2 may be additionally disposed on the inlet 11 of the printer 1 to allow the printer 1 to print, cut and print and cut at the same time. Moreover, the continuous feeding and cutting device 2 is capable of cutting automatically, it is convenient for a user to take the printed document, and the printer 1 is also prevented from damaged caused by too many unprinted continuous form papers 100 contained in the printer 1.

Additionally, the paper picking module 22 of this disclosure has the electromagnetic clutch 2241 which is capable of engaging the linking gear 121 and rotated with the linking gear 121 when powered on, so that it is more power efficient compared with the related art which uses a stepper motor for driving the paper picking module 22 to pick paper sheet.

Moreover, the paper presser 25 is disposed between the he fixed seat 251 and the pressing pulley 252 for an elastic supporting by the spring 253, thereby driving the pressing pulley 252 to press the continuous form paper 100 and keep the printer 1 to print and pick paper continuously. However, the moment of cutting the continuous form paper 100 when the paper picking module 22 stops transferring the continuous form paper 100, the continuous form paper 100 may be prevented from pulling via a buffer in the horizontal direction caused by a rotation of the pressing pulley 252 and a buffer in the vertical direction caused by a compression or an extension of the spring 253. Therefore, the continuous feeding and cutting device 2 can stably transfer and cut the continuous form paper 100.

Figure 3:
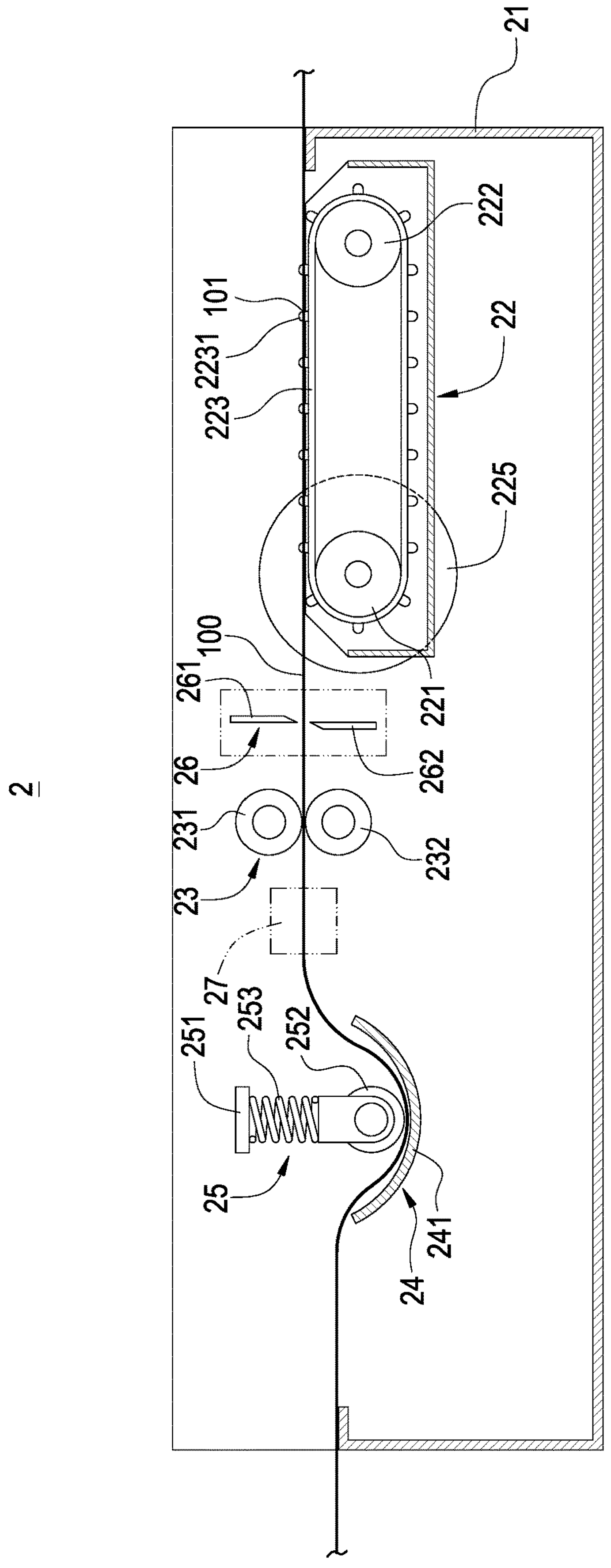
FIG. 3 is a cross-sectional view showing a continuous feeding and cutting device according to another embodiment of this disclosure.
Figure 4:
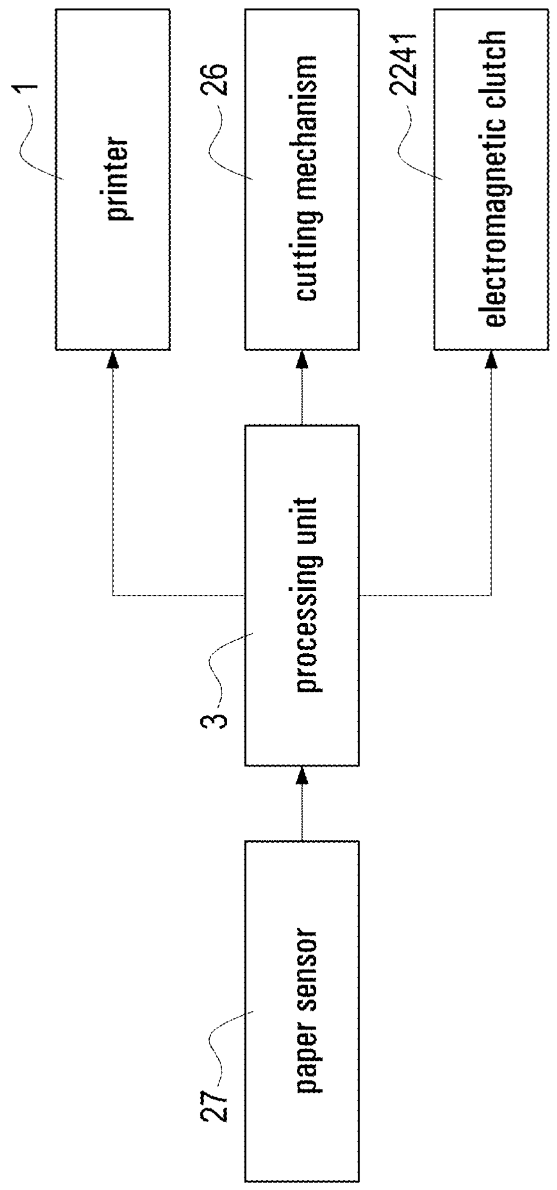
FIG. 4 is a block diagram showing the printing equipment of this disclosure.

According to FIG. 3 showing a paper picking module 22 according to another embodiment of this disclosure, the embodiment shown in FIG. 3 is similar to the embodiment shown in FIGS. 1 to 2. The difference between the embodiment shown in FIG. 3 and the embodiment shown in FIGS. 1 to 2 is that the paper picking module 22 further has a stepper motor 225 connected to the driving wheel 221 for driving the driving wheel 221.

Further explanation is described following. Comparing with the embodiment of FIGS. 1 to 2, the electromagnetic clutch 2241 for engaging the linkage gear 121 and rotating with the linkage gear 121 when powered on is omitted in this embodiment. Instead, a stepper motor 225 is applied for driving the paper picking module 22 to pick paper sheet.

In addition, the processing unit 3 is electrically connected to the stepper motor 225. When the processing unit 3 controls a rotation speed of the stepper motor 225 when receiving the printing information.

What is claimed is:

1. A printing equipment, used for a continuous form paper, the printing equipment comprising:

a printer, comprising an inlet; and a continuous feeding and cutting device, detachably connected to the printer and disposed corresponding to the inlet, the continuous feeding and cutting device comprising:

a paper picking module, configured to transfer the continuous form paper to the inlet;

a buffering module, arranged between the inlet and the paper picking module, wherein the buffering module is configured to guide the continuous form paper in a curved manner to the inlet;

a cutting mechanism, arranged between the paper picking module and the buffering module, and configured to cut the continuous form paper; and a processing unit, electrically connected to the printer and the cutting mechanism, the processing unit configured to control the cutting mechanism to cut the continuous form paper;

wherein the paper picking module comprises a driving wheel, a follower wheel, and a transmission endless belt covering the driving wheel and the follower wheel and rotating with the driving wheel, the transmission endless belt comprising a plurality of bumps, the plurality of bumps configured for insertion into a plurality of holes defined by the continuous form paper;

wherein the printer comprises a feeding mechanism disposed corresponding to the inlet, the feeding mechanism comprises a linking gear, the paper picking module further comprises a transmission mechanism, one end of the transmission mechanism is connected to the driving wheel to rotate the driving wheel, the transmission mechanism comprises an electromagnetic clutch disposed on another end thereof to be engaged with the linking gear, the electromagnetic clutch comprises a driving part and a driven part engageable with or separatable from each other, the driving part is engagable with the linking gear and rotatable with the linking gear, the processing unit is electrically connected to the electromagnetic clutch, the processing unit is configured to control the driving part to be engaged with or released from the driven part.

2. The printing equipment according to claim 1, wherein the transmission mechanism comprises the electromagnetic clutch, a driven wheel, a first track and a second track, the first track encircles the driven part and the driven wheel and rotates with the driven part, the second track encircles the driven wheel and the driving wheel and rotates with the driven wheel.

3. The printing equipment according to claim 1, wherein the buffering module comprises a curved guide and a paper presser, the curved guide is arranged between the inlet and the paper picking module to make the continuous form paper be curved by the curved guide and then be transferred to the inlet, the paper presser is arranged over the curved guide, and the paper presser is configured to press the continuous form paper.

4. The printing equipment according to claim 3, wherein the paper presser comprises a fixed seat, a pressing pulley and a spring, the fixed seat is arranged over the curved guide, the pressing pulley is arranged between the curved guide and the fixed seat, the spring is elastically disposed between the fixed seat and the pressing pulley to drive the pressing pulley to press the continuous form paper, the continuous feeding and cutting device further comprises a portable platform, the fixed seat is extended from the portable platform.

5. The printing equipment according to claim 1, wherein the continuous feeding and cutting device further comprises a paper fixing wheel arranged between the buffering module and the cutting mechanism for clamping the continuous form paper.

6. The printing equipment according to claim 5, wherein the continuous feeding and cutting device further comprises a paper sensor, the paper sensor is arranged between the paper fixing wheel and the buffering module for generating a paper detect signal when detecting the continuous form paper, the processing unit is configured to receive the paper detect signal to control the cutting mechanism to cut the continuous form paper.

7. A continuous feeding and cutting device, for use with a printer and a continuous form paper, the printer comprising an inlet, the continuous feeding and cutting device comprising:

a portable platform, detachably connectable to the printer corresponding to the inlet;

a paper picking module, accommodated in the portable platform and configured to transfer the continuous form paper to the inlet;

a buffering module, accommodated in the portable platform and arranged between the inlet and the paper picking module, wherein the buffering module is configured to guide the continuous form paper in a curved manner to the inlet;

a cutting mechanism, accommodated in the portable platform and arranged between the paper picking module and the buffering module, and configured to cut the continuous form paper; and a processing unit, configured to be electrically connected to the cutting mechanism, the processing unit configured to control the cutting mechanism to cut the continuous form paper;

wherein the paper picking module comprises a driving wheel, a follower wheel, and a transmission endless belt covering the driving wheel and the follower wheel and rotating with the driving wheel, the transmission endless belt comprising a plurality of bumps, the plurality of bumps configured for insertion into a plurality of holes defined by the continuous form paper;

wherein the printer comprises a feeding mechanism disposed corresponding to the inlet, the feeding mechanism comprises a linking gear, the paper picking module further comprises a transmission mechanism, one end of the transmission mechanism is connected to the driving wheel to rotate the driving wheel, the transmission mechanism comprises an electromagnetic clutch disposed on another end thereof to be engaged with the linking gear, the electromagnetic clutch comprises a driving part and a driven part engageable with or separatable from each other, the driving part is configured to engage with the linking gear and rotatable with the linking gear, the processing unit is electrically connected to the electromagnetic clutch, the processing unit is configured to control the driving part to be engaged with or released from the driven part.

8. The continuous feeding and cutting device according to claim 7, wherein the transmission mechanism comprises the electromagnetic clutch, a driven wheel, a first track and a second track, the first track encircles the driven part and the driven wheel and rotates with the driven part, the second track encircles the driven wheel and the driving wheel and rotates with the driven wheel.

9. The continuous feeding and cutting device according to claim 7, wherein the buffering module comprises a curved guide and a paper presser, the curved guide is arranged between the inlet and the paper picking module to make the continuous form paper be curved by the curved guide and then be transferred to the inlet, the paper presser is arranged over the curved guide, and the paper presser is configured to press the continuous form paper.

10. The continuous feeding and cutting device according to claim 9, wherein the paper presser comprises a fixed seat, a pressing pulley and a spring, the fixed seat is arranged over the curved guide, the pressing pulley is arranged between the curved guide and the fixed seat, the spring is elastically disposed between the fixed seat and the pressing pulley to drive the pressing pulley to press the continuous form paper, the fixed seat is extended from the portable platform.

11. The continuous feeding and cutting device according to claim 7, further comprising a paper fixing wheel arranged between the buffering module and the cutting mechanism for clamping the continuous form paper.

12. The continuous feeding and cutting device according to claim 11, further comprising a paper sensor arranged between the paper fixing wheel and the buffering module for generating a paper detect signal when detecting the continuous form paper, the processing unit configured to receive the paper detect signal to control the cutting mechanism to cut the continuous form paper.

* * * * *